(12) United States Patent
Nandavar et al.

(10) Patent No.: US 11,561,848 B2
(45) Date of Patent: Jan. 24, 2023

(54) POLICY-BASED LOGGING USING WORKLOAD PROFILES

(71) Applicant: Hewlett Packard Enterprise Development LP, Houston, TX (US)

(72) Inventors: Divakar Padiyar Nandavar, Bangalore Karnataka (IN); Sonu Sudhakaran, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/304,026

(22) Filed: Jun. 14, 2021

(65) Prior Publication Data

US 2022/0398151 A1 Dec. 15, 2022

(51) Int. Cl.
*G06F 11/00* (2006.01)
*G06F 11/07* (2006.01)
*G06F 11/34* (2006.01)

(52) U.S. Cl.
CPC ...... *G06F 11/0781* (2013.01); *G06F 11/0787* (2013.01); *G06F 11/3433* (2013.01); *G06F 11/3476* (2013.01)

(58) Field of Classification Search
CPC ............. G06F 11/0781; G06F 11/0787; G06F 11/3433; G06F 11/3476
See application file for complete search history.

(56) References Cited

U.S. PATENT DOCUMENTS

| | | | | |
|---|---|---|---|---|
| 6,820,035 B1 * | 11/2004 | Zahavi | ............... | G06F 11/3447 714/E11.193 |
| 6,871,228 B2 * | 3/2005 | Shah | ................. | H04L 41/0677 709/200 |
| 7,275,104 B1 * | 9/2007 | Martinez | ............... | H04L 41/069 709/224 |
| 7,398,429 B2 * | 7/2008 | Shaffer | ............... | G06F 11/3636 714/39 |
| 7,636,736 B1 * | 12/2009 | Kumar | ............... | G06F 16/1734 707/999.102 |
| 7,653,633 B2 * | 1/2010 | Villella | ............... | G06F 11/3476 707/648 |
| 8,495,429 B2 * | 7/2013 | Fu | ...................... | G06F 11/3608 714/25 |
| 8,972,422 B2 * | 3/2015 | Dow | ..................... | G06F 16/335 706/62 |
| 9,323,651 B2 * | 4/2016 | Garrett | ................... | G06F 9/505 |
| 9,342,438 B2 | 5/2016 | Han | | |

(Continued)

OTHER PUBLICATIONS

Yuan, D., et al.; "Improving Software Diagnosability via Log Enhancement"; Mar. 5-11, 2011; 12 pages.

*Primary Examiner* — Amine Riad
(74) *Attorney, Agent, or Firm* — Hewlett Packard Enterprise Patent Department

(57) ABSTRACT

Examples described herein relate to policy-based logging using workload profiles. A workload profile of a first workload is identified. Based on the workload profile, a logging policy, which includes a predefined log pattern and a predefined log depth, is compiled. Workload log messages of a predetermined log level that are associated with the first workload are stored in a cache memory. On detecting the predefined log pattern in the workload log messages stored in the cache memory, the workload log messages are logged to a log file based on the predefined log depth.

20 Claims, 9 Drawing Sheets

(56) References Cited

U.S. PATENT DOCUMENTS

| | | | |
|---|---|---|---|
| 9,535,780 B2 | 1/2017 | Rajamanickam et al. | |
| 9,928,155 B2* | 3/2018 | Xu | G06F 11/3636 |
| 10,007,571 B2 | 6/2018 | Rajagopal et al. | |
| 2004/0194090 A1* | 9/2004 | Kelly | G06F 11/3409 |
| | | | 718/100 |
| 2006/0117091 A1* | 6/2006 | Justin | G06F 11/3476 |
| | | | 714/E11.204 |
| 2007/0299631 A1* | 12/2007 | Macbeth | G06F 11/3476 |
| | | | 702/182 |
| 2010/0211826 A1* | 8/2010 | Villella | G06F 11/3476 |
| | | | 714/39 |
| 2011/0067008 A1* | 3/2011 | Srivastava | G06F 11/3466 |
| | | | 717/128 |
| 2011/0270957 A1 | 11/2011 | Phan et al. | |
| 2014/0310679 A1* | 10/2014 | Bhattacharya | G06F 11/362 |
| | | | 717/102 |
| 2015/0143182 A1* | 5/2015 | Rajamanickam | G06F 11/0781 |
| | | | 714/48 |
| 2016/0124823 A1* | 5/2016 | Ruan | G06F 11/079 |
| | | | 714/26 |
| 2016/0171801 A1* | 6/2016 | Kim | G06F 11/3476 |
| | | | 701/1 |
| 2017/0134590 A1* | 5/2017 | Mathison | H04L 12/1407 |
| 2018/0063195 A1* | 3/2018 | Nimmagadda | H04L 63/0263 |
| 2019/0018750 A1* | 1/2019 | Kludy | G06F 21/6245 |
| 2020/0228573 A1* | 7/2020 | Nimmagadda | H04L 63/0263 |

* cited by examiner

POLICY-BASED LOGGING USING WORKLOAD PROFILES

BACKGROUND

Logging refers to the recording of events, which occur during the execution of a workload on a system, such as a computer system. A workload may store the events as log messages in log files. The log files may be archived, monitored, and analyzed, to identify incidents and maintain the overall health and performance of the workloads, systems, and networks. Management of logs provides useful insights using analytics and troubleshooting, and is, therefore, integral to Information Technology (IT) environments.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
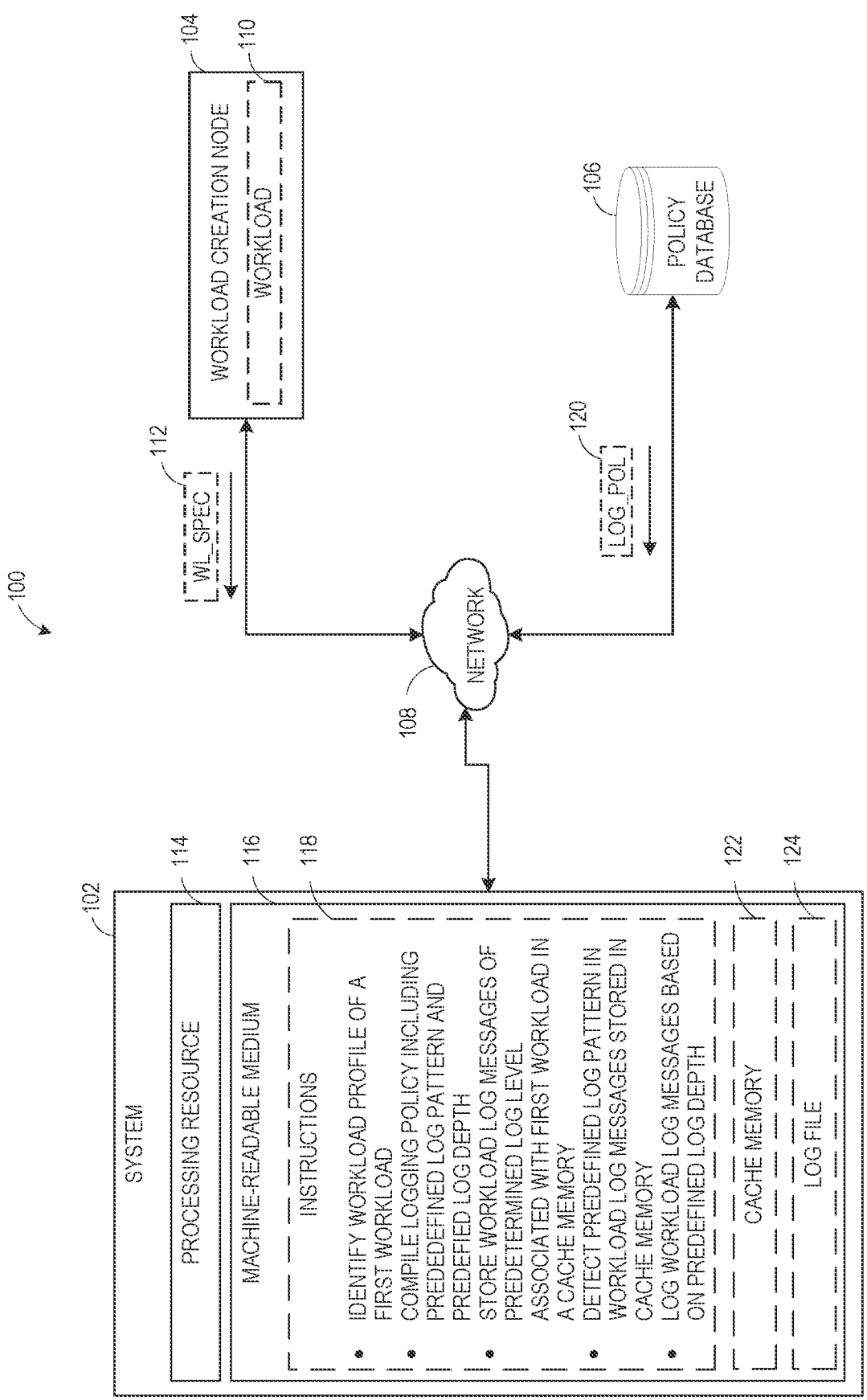
FIG. 1 depicts a networked system including a system for policy-based logging using workload profiles, in accordance with an example.

It is emphasized that, in the drawings, various features are not drawn to scale. In fact, in the drawings, the dimensions of the various features may have been increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise. As used herein, the term "includes" means includes but not limited to, and the term "including" means including but not limited to. The term "based on" means based at least in part on.

Generally, workloads are designed to generate log messages of predefined log levels. A workload may refer to any set of machine-executable instructions (e.g., an application) that may also perform logging based on the predefined log levels. Log levels may refer to the different categories of log messages based on the urgency or importance of events occurring during the execution of the workload. Some of the commonly used log levels may include "INFO", "WARN", "ERROR", "DEBUG", "TRACE", etc. The "INFO" log level may indicate that the application is working as expected. The "WARN" log level may indicate that the application is working as expected, but an unexpected event (e.g. low disk space) has occurred or might occur in near future. The "ERROR" log level may indicate that the application is not performing a function due to a serious issue. The "DEBUG" log level may provide detailed information, which may be useful for diagnosing problems. Further, the "TRACE" log level may provide fine-grained information capturing all the details of the application behavior.

The volume of information available in each log level message may vary. For example, "ERROR" or "WARN" log levels may provide limited information about an event. On the other hand, "DEBUG" or "TRACE" log levels may provide sufficient information for diagnosing issues associated with the application. In a production environment, the log levels are set to either "ERROR" or "WARN" to limit the quantity of log messages. When an error is encountered in such an environment, the context and information regarding the error scenario may not be sufficient. This hinders the timely resolution of the incident affecting the service level agreements (SLAs), such as availability, response time, latency, Mean Time To Respond, Mean Time To Repair (MTTR), Mean Time To Failure (MTTF), and the like In some cases, the log level may be set to "DEBUG" or "TRACE" to obtain more detailed information about the error. Typically, the detailed information may be used for reproducing the error to determine a root-cause. However, in a production environment, it may be challenging to change the system log settings dynamically without a change control process, which might not allow timely analysis or resolution of the error. Further, even if the change control process allows reconfiguration of the system log settings to set the log level to DEBUG, the error scenario may not be exactly reproducible and may involve significant time and effort.

To that end, in accordance with aspects of the present disclosure, policy-based logging using workload profiles are presented. In some examples, a workload profile of a first workload is identified. Based on the workload profile, a logging policy, which includes a predefined log pattern and a predefined log depth, is compiled. Workload log messages of a predetermined log level that are associated with the first workload are stored in a cache memory. On detecting the predefined log pattern in the workload log messages stored in the cache memory, the workload log messages are logged to a log file based on the predefined log depth.

In some examples, the depth of logging may be based on the number of log messages associated with multiple threads or processes of the first workload. The depth may also be based on the number of log messages associated with threads and processes of multiple workloads dependent on the first workload or vice versa. As will be appreciated, this allows logging of larger contextual information from not just a given workload but also multiple dependent workloads running on the same system or different systems. Further, the policy-based logging using the workload profiles may provide enhanced performance of the workloads, systems, and target environments (e.g., Kubernetes clusters) either in a customer's on-premise private cloud datacenter owned or leased by the customer or consumed as a public cloud provider's as-a-service offering (e.g., through a pay-per-use or consumption-based financial model). Further, enhanced logging using the compiled policies as effected by various example aspects presented herein ensures that the latest policies necessary for the logging are applied at the target environment. For instance, any updates to the policies in the policy database or to the workload may be considered for compiling or recompiling policies from the policy database.

Referring now to the drawings, in FIG. 1, a network system 100 is depicted, in accordance with an example. The network system 100 may include a system 102, a workload creation node 104, and a policy database 106 coupled to each other via a network 108. In some examples, the networked system 100 may be a distributed system where the system 102, the workload creation node 104, and the policy database 106 may be located at physically different locations (e.g., on different racks, on different enclosures, in different buildings, in different cities, in different countries, and the like) while being connected via the network 108. In other examples, any combination of the system 102, the workload creation node 104, and the policy database 106 may be co-located.

Examples of the network 108 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 108 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 108 may be enabled via a wired (e.g., copper, optical communication, etc.) or wireless (e.g., Wi-Fi®, cellular communication, satellite communication, Bluetooth, etc.) communication technologies. In some examples, the network 108 may be enabled via private communication links including, but not limited to, communication links established via Bluetooth, cellular communication, optical communication, radio frequency communication, wired (e.g., copper), and the like. In some examples, the private communication links may be direct communication links between the system 102, the workload creation node 104, and the policy database 106.

The workload creation node 104 may be a device including a processor or microcontroller and/or any other electronic component, or a device or system that may facilitate various workload development, compute, and/or data storage services. Examples of the workload creation node 104 may include, but are not limited to, a desktop computer, a laptop, a smartphone, a server, a computer appliance, a workstation, a storage system, or a converged or hyperconverged system, and the like. In FIG. 1, although the networked system 100 is shown to include one workload creation node 104, the networked system 100 may include any number of workload creation nodes, without limiting the scope of the present disclosure. The workload creation nodes may have similar or varying hardware and/or software configurations in a given implementation of the networked system 100.

The term workload, as used to describe workload 110 for example, may refer to a computing resource including, but not limited to, an application (e.g., software program), a virtual machine (VM), or a containerized application (e.g., in the form of a container or a pod of containers). In some examples, the workload may include any piece of code that may be developed as a microservice. As will be understood, a workload, such as a VM, may be an instance of an operating system hosted on a given worker node via a VM host program, such as a hypervisor. Further, a workload such as a container may be a packaged application with its dependencies (e.g., operating system resources, processing allocations, memory allocations, etc.) hosted on a given worker node via a container host program, such as a container runtime (e.g., Docker Engine), for example. Further, in some examples, workloads may include pods that are formed by grouping one or more containers. For example, a set of containers that are associated with a common application may be grouped to form a pod.

In the description, the workload 110 is described as being an application, for illustration purposes. Applications in containers may be managed via a container-orchestration system, such as Kubernetes. In the example of FIG. 1, the workload creation node 104 is shown to facilitate workload creation or development. For example, developers may work on the workload creation nodes 104 to write and develop the workloads 110. Although a single workload 110 is shown at the workload creation node 104 as depicted in FIG. 1, the workload creation node 104 may facilitate the development of any number of workloads 110 depending on respective hardware and/or software configurations. In some examples, the system 102 may also serve as a workload creation node 104 or vice-versa.

The system 102 may provide resources, for example, compute, storage, and/or networking capabilities, for one or more workloads to execute thereon. The system 102 may facilitate a target environment for executing the workloads 110. Examples of the system 102 may include, but are not limited to, a server, clusters of servers, a computer appliance, a workstation, a desktop computer, a laptop, a smartphone, a storage system, or a converged or hyperconverged system, and the like. Examples of the target environment in the system 102 may include container-orchestration systems, such as Kubernetes, and clusters of container-orchestration systems. In the description, the system 102 may be described as one or more Kubernetes clusters, for illustration purposes. In FIG. 1, although the networked system 100 is shown to include one system 102, the networked system 100 may include any number of systems, without limiting the scope of the present disclosure. By way of example, while some systems may have high-end compute capabilities, some systems may facilitate strong data security, and certain target environments may have enhanced thermal capabilities. Further, in certain examples, the system 102 may be or may include a virtual machine or a containerized application executing on hardware in the networked system 100.

In some examples, the system 102 may include a processing resource 114 and a machine-readable medium 116. The machine-readable medium 116 may be any electronic, magnetic, optical, or other physical storage device that may store data and/or executable instructions 118. For example, the machine-readable medium 116 may include one or more of a Random Access Memory (RAM), an Electrically Erasable Programmable Read-Only Memory (EEPROM), a storage drive, a flash memory, a Compact Disc Read Only Memory (CD-ROM), and the like. The machine-readable medium 116 may be non-transitory. The machine-readable medium may include a cache memory 122 and a log file 126 to store data, including log messages generated by a workload. As described in detail herein, the machine-readable medium 116 may be encoded with the executable instructions 118 to perform one or more methods, for example, methods described in FIGS. 3, 4A, 4B, and 4C.

Further, the processing resource 114 may be a physical device, for example, one or more central processing units (CPU), one or more semiconductor-based microprocessors, one or more graphics processing units (GPU), application-specific integrated circuit (ASIC), a field programmable gate array (FPGA), other hardware devices capable of retrieving and executing instructions 118 stored in the machine-readable medium 116, or combinations thereof. The processing resource 114 may fetch, decode, and execute the instructions 118 stored in the machine-readable medium 116 to perform policy-based logging using workload profiles (described further below). As an alternative or in addition to executing the instructions 118, the processing resource 114 may include at least one integrated circuit (IC), control logic, electronic circuits, or combinations thereof that include a number of electronic components for performing the functionalities intended to be performed by the system 102 (described further below). Moreover, in certain examples, where the system 102 may be a virtual machine or a containerized application, the processing resource 114 and the machine-readable medium 116 may represent a processing resource and a machine-readable medium of the hardware or a computing system that hosts the system 102 as the virtual machine or the containerized application.

During operation, the processing resource 114 may identify a workload profile of a first workload deployed at the target environment, which may be facilitated in the system 102. In some examples, the workload profile may be identified based on a workload specification 112 (labeled as WL_SPEC), which may be received from the workload creation node 104. The workload specification 112 may include information regarding characteristics of the workload 110. In some examples, a plurality of workload profiles may be stored locally in the system 102, or alternatively, in a remote database, such as the policy database 108, accessible over the network 108. A workload profile may include predefined characteristics or configurations, for example. In some examples, the processing resource 114 may identify a workload profile based on a match between the workload characteristics specified in the workload specification and the workload profiles.

Figure 2:
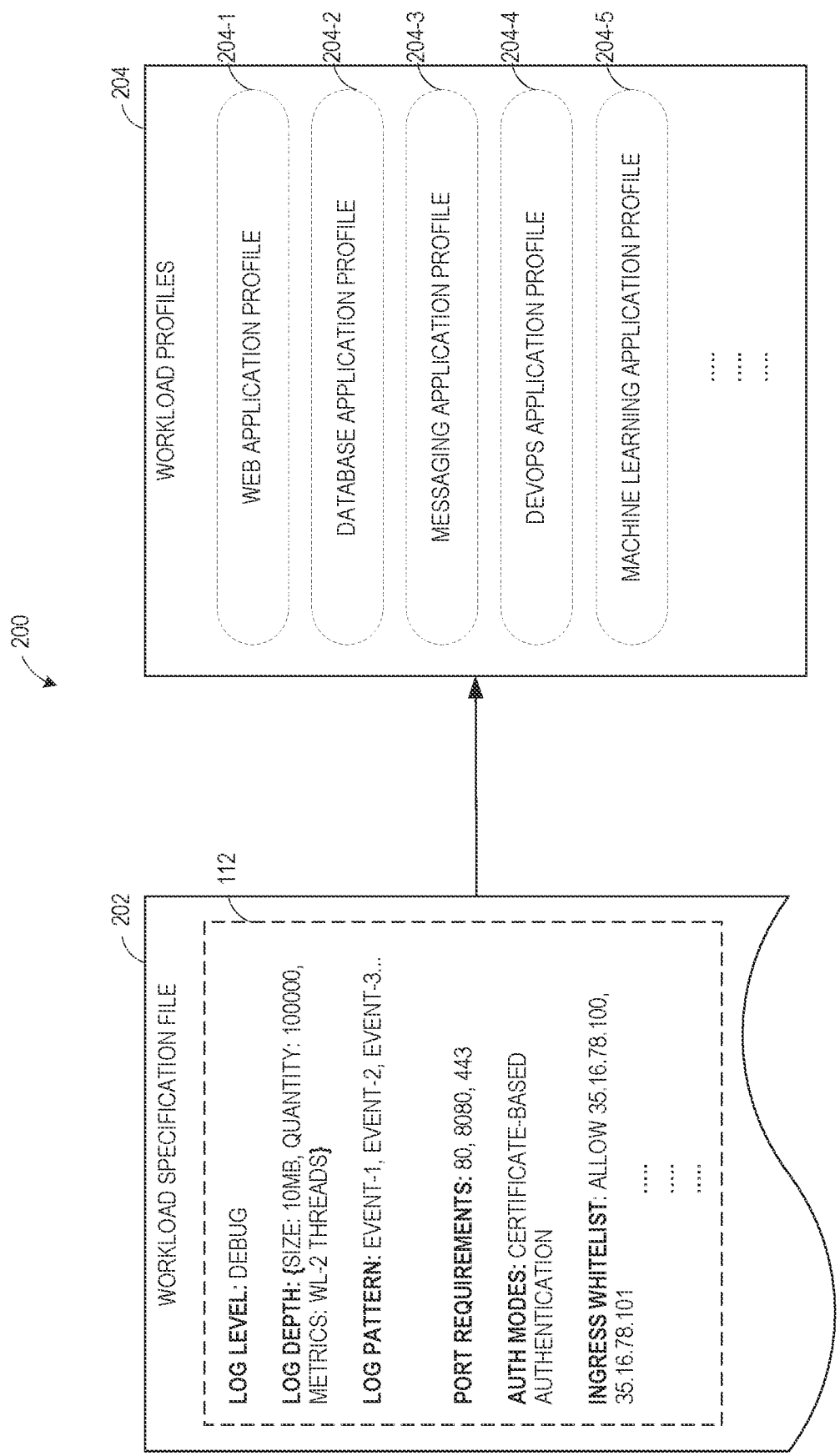
FIG. 2 depicts a workload specification and associated workload profiles, in accordance with an example.

FIG. 2 is a block diagram 200 depicting an example workload specification file 202 and an example list of workload profiles 204. The workload specification file 202 may be a configuration file, which may include the workload specification 112 in a specific file format, such as JavaScript Object Notation (JSON), Extensible Markup Language (XML), or YAML. The workload specification 112 may describe the logging behavior of an associated workload. In particular, the workload specification 112 may specify certain requirements of the workload 110.

In some examples, the workload specification 112 may specify user-defined logging configuration, such as a user-defined log level, a user-defined log depth, a user-defined log pattern, and the like. For each logging configuration, one or more values may be specified in the workload specification. For example, the log levels may indicate a preferred log level, such as DEBUG log messages. The log depth may indicate the size of the log messages, quantity of the log messages to be logged, and the metrics influencing the size and/or quantity. For example, the size of the log messages may be 10 MB, the quantity of log messages may be a number of log messages (e.g., 100,000 log messages), and the metrics may specify the log messages produced by threads or processes of a second workload (WL-2). In some examples, a thread may be a sequence of instructions of a workload, such as the second workload. A process may refer to a collection of threads associated with the workload. The log patterns may specify one or more event patterns in the log messages that may be used to trigger the logging process. For example, the log pattern may specify a sequence of events, such as Event-1, Event-2, Event-3, etc. In some examples, the sequence of events may be associated with one or more threads or processes of the second workload.

In some examples, the workload specification 112 may also specify other configurations like security configuration, which may define access and control settings for secure operation of the workload. For example, the security configuration may include application ports, request privileges, ingress whitelist, authentication modes, exposure modes, and the like. For each configuration, a list of sub-configurations and associated values may be included in the workload specification. For example, the application ports may include the list of sub-configurations, such as Port 80, Port 8080, Port 443, Port 22, Port 20, etc. Authentication modes may include certificate-based authentication. Ingress list may include a list of sources (e.g., IP addresses 35.16.78.100, 35.16.78.101) and domains (e.g., hpe.com) allowed. For request privileges, the sub-configurations may include roots needed (True/False) and/or allow-host network (Yes/No).

The processing resource 114 of FIG. 1 may map the workload specification 112 to one or more workload profiles 204. Each workload profile 204 may include one or more predefined configurations and/or sub-configurations. The workload profiles 204 may have predefined values for configurations and/or sub-configurations that are selected as archetypical of a workload represented by that workload profile. Examples of the workload profiles 204 may include web application profile 204-1, database application profile 204-2, messaging application profile 204-3, DevOps application profile 204-4, a machine learning application profile 204-5, and the like. In some examples, the predefined values of the workload profiles 204 may also be modified periodically to avoid state-of-the-art security lapses.

Referring back to FIG. 1, the system 102 may identify the workload profile based on a matching or mapping between the workload specification 112 and the workload profile. The system 102 may compile a logging policy 120 (labeled as LOG_POL) based on the workload profile (described further with reference to FIGS. 4A, 4B, and 4C). The logging policy may include a predefined log pattern and predefined log depth associated with the workload profile. In some examples, the network system 100 may include one or more policy compilation systems (not shown in FIG. 1) including data storage, compute, and networking resources, coupled to the system 102 and the policy database 106 over the network 108. The policy compilation systems may receive workload profiles from the system 102, perform compilation of logging policies from the policy database 106, and send the compiled logging policies to the system 102.

Further, the processing resource 114, of the system 102, may store workload log messages associated with the first workload in a cache memory 122. The workload log messages are of a predetermined log level, such as "DEBUG" log level or "TRACE" log level. The processing resource 114 may detect the predefined log pattern in the workload log messages stored in the cache memory 122. The processing resource 114 may log the workload log messages to a log file 124 based on the predefined log depth (described further with respect to FIG. 4).

System 100 may be useful in implementations where workloads are launched by and for a customer on infrastructure (e.g., system 102) that is provided by a vendor to the customer "as a service" and/or paid for by the customer on a consumption or usage basis. Such infrastructure may be located on-premise in the customer's data center or colocation data center. The infrastructure and/or the workloads may be managed by the vendor. Thus, logging policies 120 may be developed, provided, and operated by the vendor to assist with management of the infrastructure or workloads.

Figure 3:
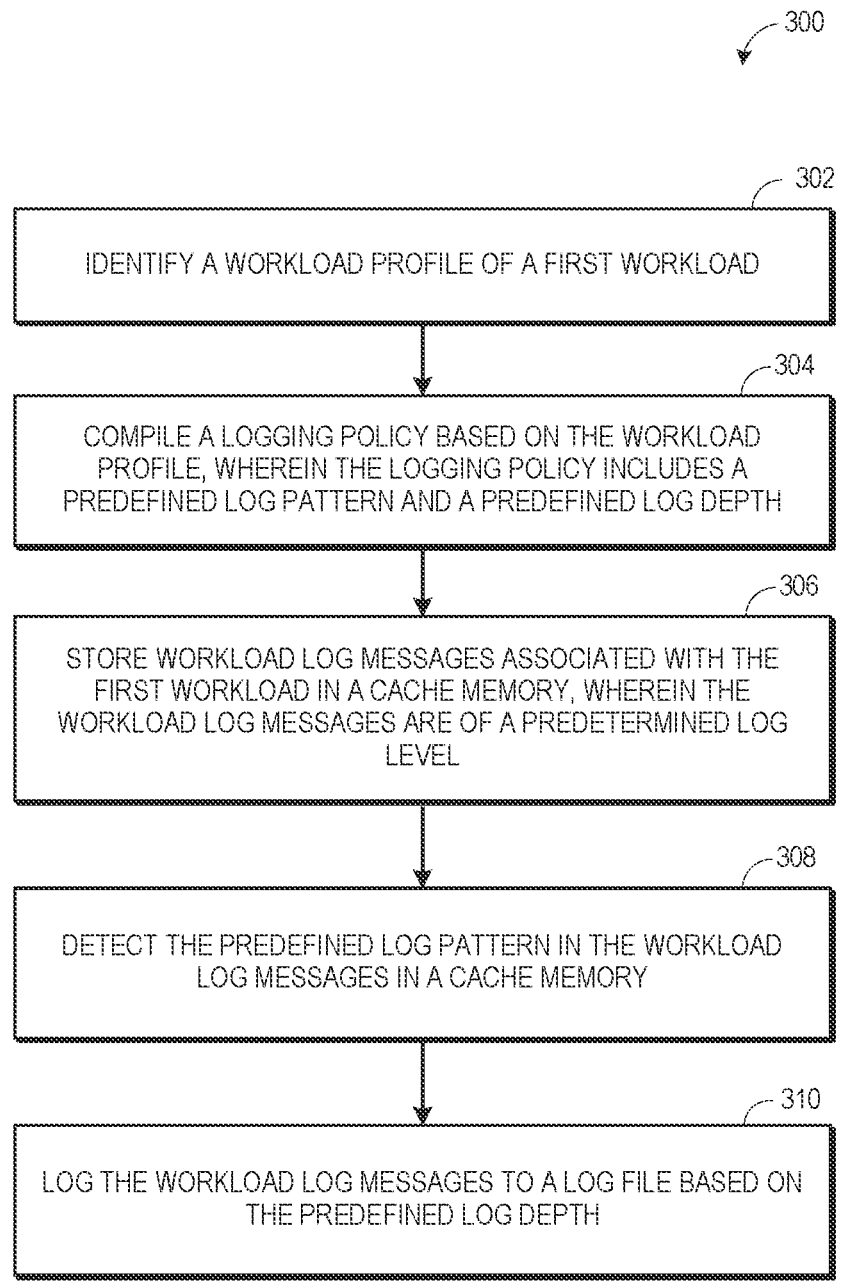
FIG. 3 is a flow diagram depicting a method for policy-based logging of workload log messages using workload profiles, in accordance with an example.

Referring now to FIG. 3, a flow diagram depicting a method 300 for performing policy-based logging using workload profiles is presented, in accordance with an example. For illustration purposes, the method 300 will be described in conjunction with the networked system 100 of FIG. 1 and elements of FIG. 2. The method 300 may include method blocks 302, 304, 306, 308, and 310 (hereinafter collectively referred to as blocks 302-310), which may be performed by a processor-based system such as, for example, the system 102. In particular, operations at each of the method blocks 302-310 may be performed by the processing resource 114 by executing the instructions 118 stored in the machine-readable medium 116 (see FIG. 1). Moreover, it is to be noted that in some examples, the order of execution of the blocks 302-310 may be different that shown in FIG. 3. For example, the blocks 302-310 may be performed in series, in parallel, or a series-parallel combination.

At block 302, the processing resource 114 may identify a workload profile of a first workload, which may be deployed at a target environment. At block 304, the processing resource 114 may compile a logging policy based on the workload profile. The logging policy may include a predefined log pattern and a predefined log depth. At block 306, the processing resource 114 may store workload log messages associated with the first workload into a cache memory. The workload log messages stored into the cache memory may be of a predetermined log level. At block 308, the processing resource 114 may detect the predefined log pattern in the workload log messages of the predetermined log level in the cache memory 122. At block 310, the processing resource 114 may log the workload log messages of the predetermined log level to a log file 124 based on the predefined log depth.

Figure 4A:
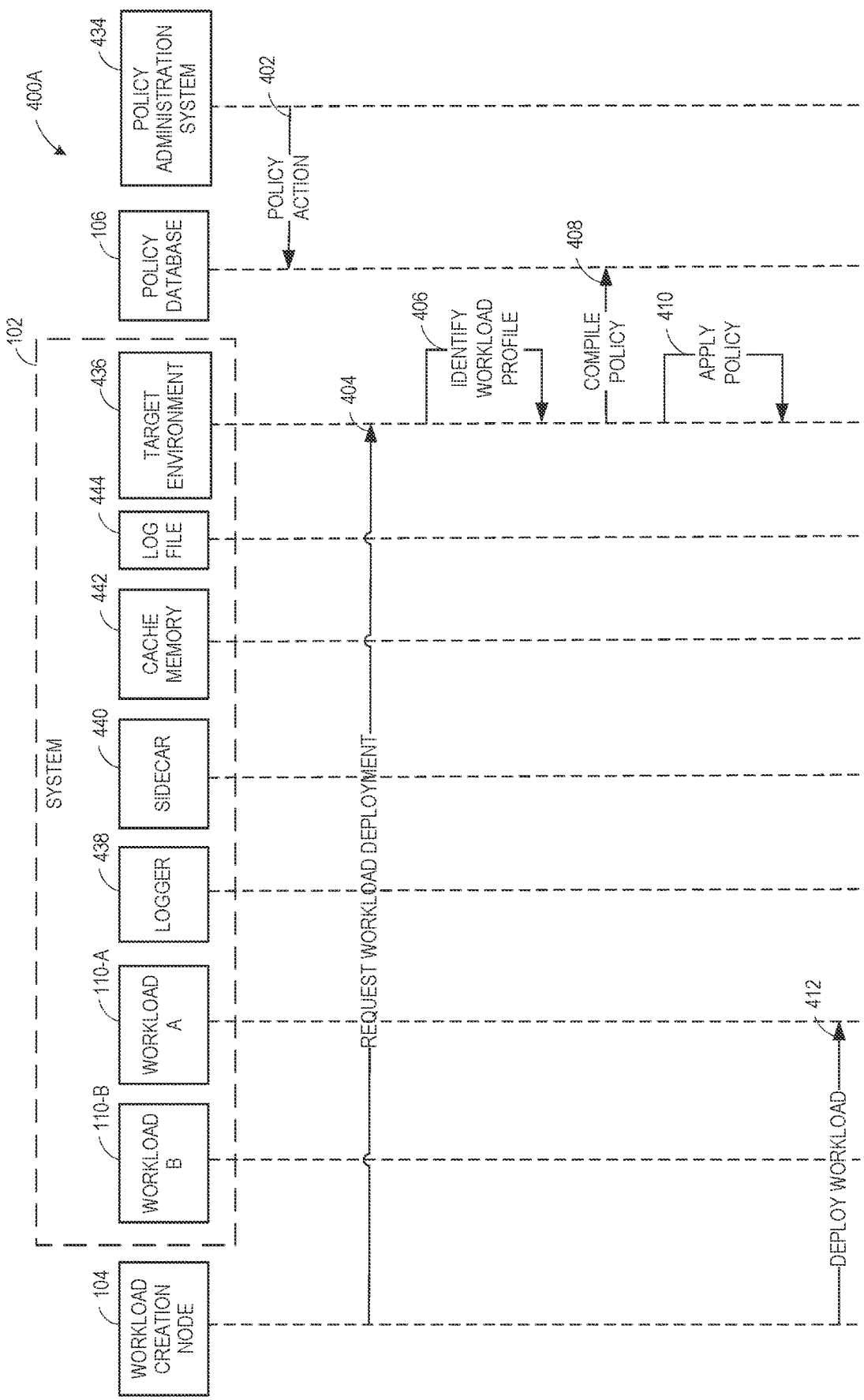
FIGS. 4A, 4B and 4C are sequence diagrams depicting policy-based logging using workload profiles, in accordance with an example.
Figure 4B:
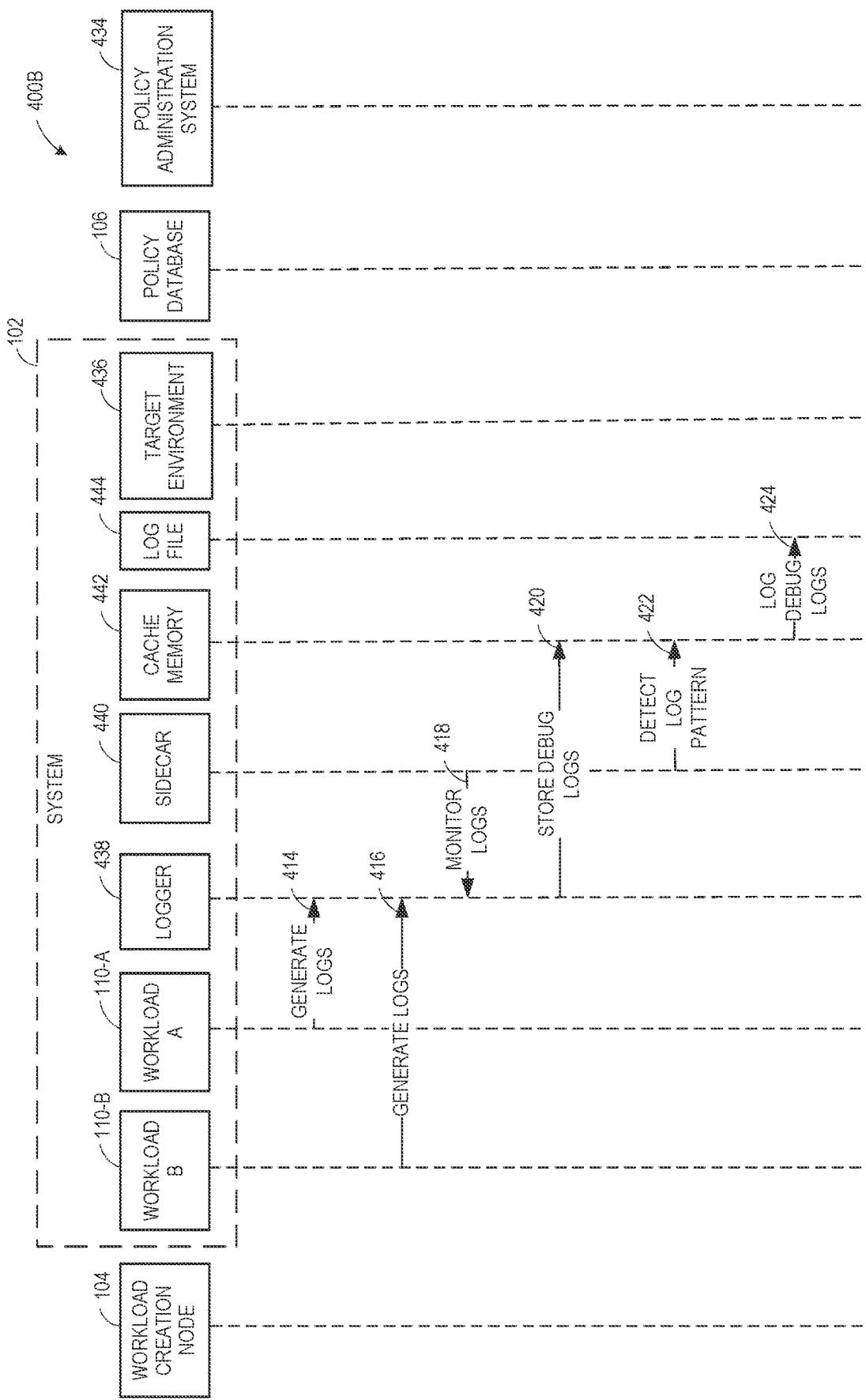
Figure 4C:
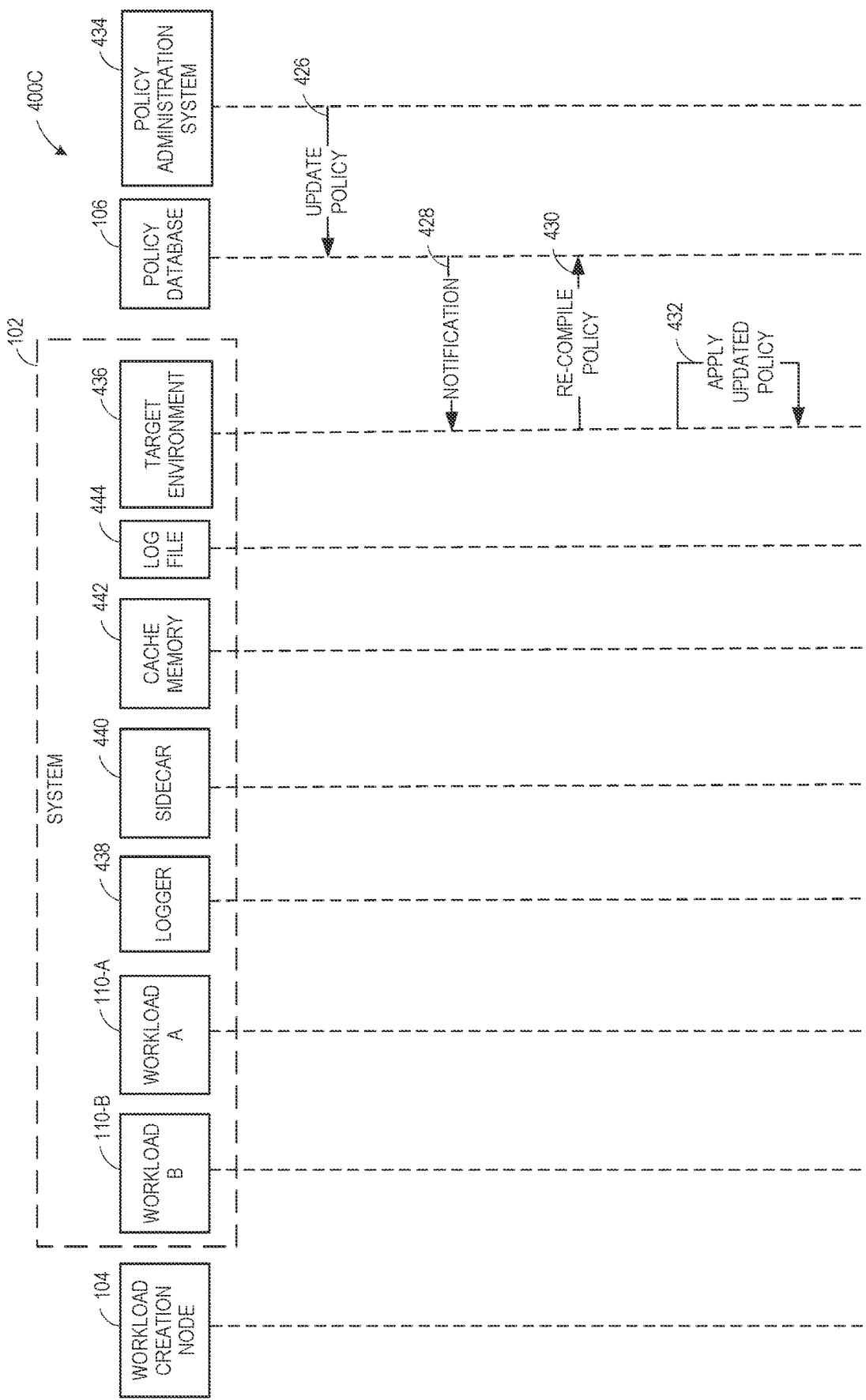

Moving now to FIGS. 4A, 4B and 4C, sequence diagrams depicting methods for policy-based logging using workload profiles are presented, in accordance with another example.

For illustration purposes, the sequences 400A, 400B, and 400C will be described in conjunction with the networked system 100 of FIG. 1. In particular, the components of FIGS. 4A, 4B, and 4C, may refer to same or similar components in various embodiments described herein. For example, the workload A 110-A may be analogous to the workload 110 in FIG. 1 after its deployment on the system 102. The cache memory 442 and the log file 444 may be respectively analogous to the cache memory 122 and the log file 124 depicted in FIG. 1.

The sequence 400A may include 402, 404, 406, 408, 410, and 412 (hereinafter collectively referred to as 402-412). The sequence 400B may include 414, 416, 418, 420, 422, and 424 (hereinafter collectively referred to as 414-424). The sequence 400C may include 426, 428, 430, and 432 (hereinafter collectively referred to as 426-432). The sequences 400A, 400B, and 400C, may be performed by processor-based systems as described earlier. Moreover, it is to be noted that in some examples, the order of execution of 402-432 may be different from the one shown in FIGS. 4A, 4B and 4C. For example, operations of 402-432 may be performed in series, in parallel, or a series-parallel combination.

At 402, a policy administration system 434 may perform one or more policy actions on the logging policies stored in the policy database 106 (an example policy administration system 434 will be described further with respect to FIG. 5). For example, the policy action may include creation of logging policies (e.g., via policy creation action 512 as described in FIG. 5). During the creation of logging policies, one or more workload profiles may be linked to the logging policies. The policy database 106 may store the created logging policies for compilation for new or existing workloads deployed in the system 102.

At 404, a target environment 436 facilitated by system 102 may receive a workload deployment request for the first workload 110-A (depicted as Workload A) from the workload creation node 104. The target environment 436 may allow deployment and execution of the first workload 110-A in the system 102. A second workload 110-B (depicted as Workload B) is shown to have been deployed prior to 404. In some examples, the target environment 436 may allow the deployment and execution of a plurality of workloads in the system 102. The workload deployment request may include a workload specification 112 associated with the first workload 110-A.

Further, at 406, the method 400A may include identifying a workload profile 204 based on the workload specification 112. As described with respect to FIG. 1 and FIG. 2, the logging configuration of the workload specification 112 may be matched with predefined configurations of one or more workload profiles 204, which may be stored in the system 102 or policy database 106. The processing resource 114 may identify one or more workload profiles based on a successful match.

At 408, the method 400A may include compiling a logging policy stored in the policy database 106. In some examples, compiling the logging policy may include retrieving a logging policy template from the policy database 106 using the identified workload profile 204. The compiling may further include creating the logging policy based on the logging policy template. In some examples, compiling the logging policy may be performed automatically, while in other examples, the logging policy may be manually compiled by or with assistance from the policy administration system 434.

Further, at 410, the method 400A may include applying the logging policy in the target environment 436. In some examples, applying the logging policies in the target environment 436 may include setting up native policies and setting up policy webhooks. The native policy may include native constructs and definitions built in to and provided by the target environment 436. Different environments may provide different types of native policies. For instance, in a Kubernetes cluster, examples of native policies may include pod security policies, network policies, scaling policies (e.g., horizontal pod autoscaler), and the like. The native constructs and definitions may be used for realizing the compiled policies in the target environment 436. Another example of applying the logging policies in the target environment 436 using a Kubernetes Operator is described with reference to FIG. 6.

At 412, the method 400A may include deploying the first workload 110-A from the workload creation node 104 to the system 102 facilitating the target environment 436.

Further, in the sequence 400B as shown in FIG. 4B, at 414, the method 400B may include recording workload log messages generated by the first workload 110-A after the completion of the deployment. The workload log messages may be recorded by a workload logger 438.

At 416, the processing resource 114 may record workload log messages associated with a second workload 110-B in the workload logger 438. In some examples, the workloads 110-A, 110-B may be containers (as described with respect to FIG. 1). In some examples, the logger 438 may also be a container capable of receiving the logs generated by workloads 110-A and 110-B. The logger 438 and the workloads 110-A, 110-B may be components of the same pod.

In some examples, the execution of the first workload 110-A may be dependent on the execution of the second workload 110-B. For instance, in the example where the first workload 110-A and the second workload 110-B are containers in a pod, the workloads may share data in a common directory, send read/write commands to a common memory, etc. In some examples, the execution of the first workload 110-A may be triggered, paused, or stopped, due to the execution of one or more threads or processes of the second workload 110-B.

At 418, the method 400B may include monitoring workload logs using a sidecar executable 440. In some examples, the sidecar executable 440 may use the compiled logging policies including predefined log pattern, predefined log depth, and log levels. In some examples, the sidecar 440 may be a containerized application which may communicate with other containers (e.g., workloads 110-A, 110-B) in a pod to monitor workload logs.

At 420, the method 400B may include storing workload log messages of a predetermined log level associated with the first workload 110-A in a cache memory 442 (e.g., cache memory 122 of FIG. 1). In some examples, the predetermined log level may be "DEBUG" or "TRACE" log level. At 422, the method 400B may include detecting a log pattern in the DEBUG level log messages stored in the cache memory 442.

At 424, the processing resource 114 may log the DEBUG log messages to a log file 444 based on a predefined log depth as defined in the logging policy. The predefined log depth may indicate a log size or log quantity based on a predetermined number of workload log messages, workload log messages associated with a predetermined period, workload log messages associated with a plurality of threads or processes of the first workload 110-A, workload log messages associated with a second workload 110-B, workload log messages associated with a plurality of threads or processes of the second workload 110-B. In some examples, the second workload 110-B may be deployed and executed at another system facilitating a target environment that is located remotely. In some examples, the predefined log depth may include workload log messages associated with a plurality of threads or processes of multiple workloads deployed over multiple systems.

Further, in the sequence 400B as shown in FIG. 4B, at 426, the policy administration system 434 may perform additional policy actions on the one or more logging policies stored in the policy database 106. The policy actions may include policy creation, policy inheritance, policy extension, policy cloning, policy validation, policy update, or policy revocation (the policy actions will be described further with reference to FIG. 5).

At 428, the method may include receiving an event notification indicative of the policy actions performed at the policy database 106. At 430, the method 400C may include recompiling the updated policy from the policy database 106. At 432, the method 400C may include applying the updated policies to the target environment 436. In some examples, the method 400C may include receiving a request to log the workload log messages of a user-defined log level from a user. The request may include a user-defined log depth. The method 400C may include logging the workload log messages of the user-defined log level based on the user-defined log depth responsive to the request.

Figure 5:
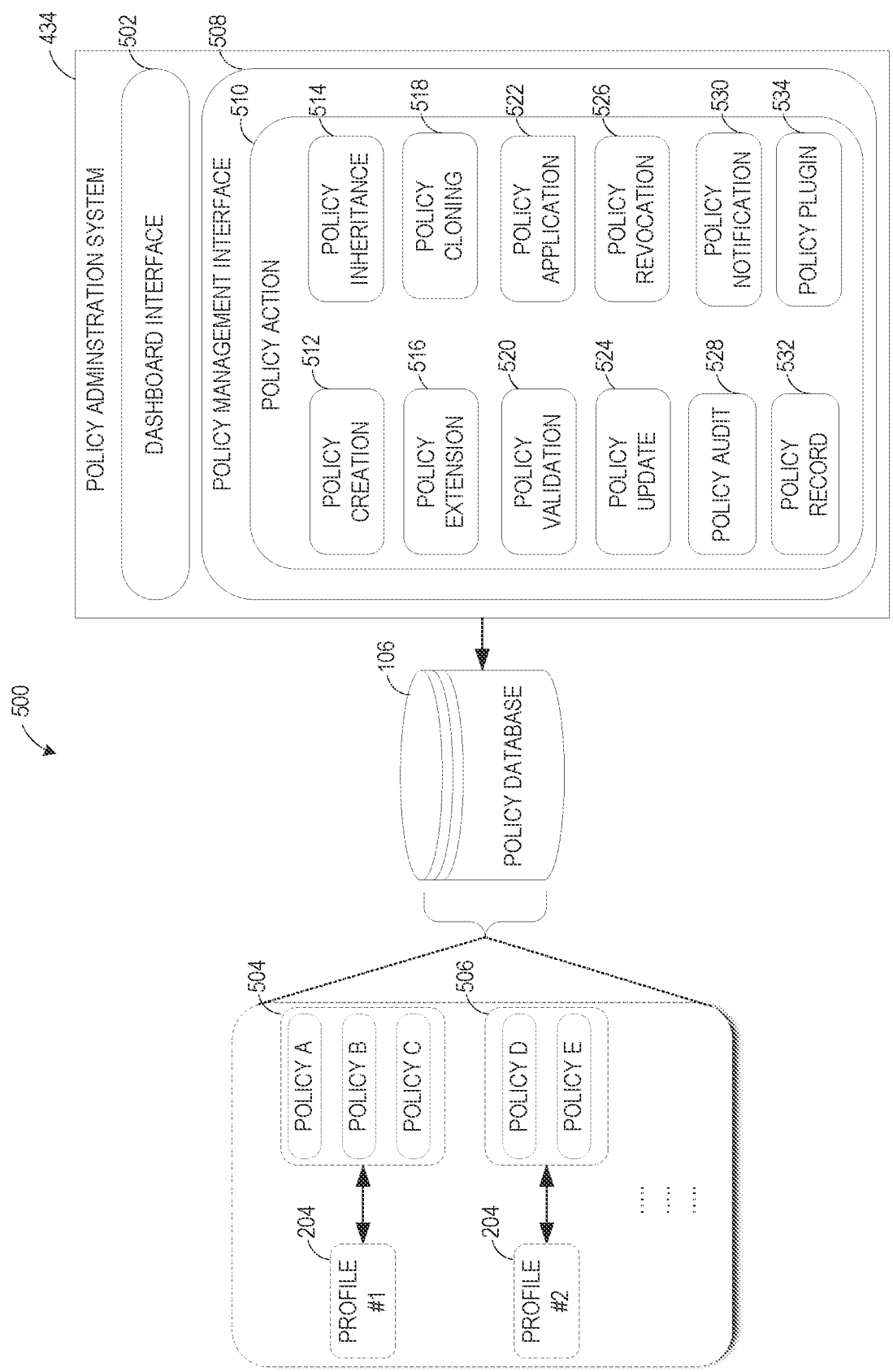
FIG. 5 is a block diagram depicting policy administration, in accordance with an example.

Moving to FIG. 5, a block diagram 500 depicting a policy database 106 and a policy administration system 434 to facilitate policy-based logging using workload profiles is presented, in accordance with an example. In some examples, the functions of the policy administration system 434 may be implemented in the system 102. Alternatively, the policy administration system 434 may be a remote computing system communicatively coupled with the system 102 over the network 108. The policy database 106 may store logging policies required for the management of logs generated by workloads as described earlier. In various examples, the policy database 106 may store different types of policies, such as custom policy templates, environment-specific policies, or global policies which may be applied in any target environment 436. In various examples, the logging policies may be attached with tags, which may indicate one or more workload profiles 204 to which those policies are associated. In some examples, each workload profile 204 may be tagged with one or more logging policies 504, 506. The tags may allow lookup, grouping, and gathering of the logging policies in the policy database 106.

In some examples, the functions performed by the policy administration system 434 may be automated using various machine learning techniques. Alternatively, the policy administration system 434 may be manually operated by a policy administrator. In some examples, the policy administration system 434 may include a dashboard interface 502 to display a summary of the status and relationships between the logging policies 504, 506, the workload profiles 204, the target environment 436, and the workload 112. For example, the summary may include a list of logging policies 504, 506 applied in target environment 436, a list of logging policies 504, 506 tagged with one or more workload profiles 204, and a list of logging policies 504, 506 not tagged with any workload profile 204. Further, the summary may also include a mapping between the logging policies 504, 506 and the workload profiles 204. The dashboard interface 502 may also display the number of target environments 436 where the logging policies 504, 506 of a specific type, such as a web application logging policy, are applied. The dashboard interface 502 may also summarize a list of available logging policies and workload profiles created with a total number of running or active instances of the workloads 110.

The policy administration system 434 may include a policy management interface 508 for performing one or more policy actions 510 on the logging policies 504, 506 stored in the policy database 106. The policy management interface 508 may include a plurality of services for performing the policy actions to facilitate creating new logging policies, making modifications to existing logging policies, removing logging policies, and the like. Through the various policy actions 510, the logging policies 504, 506 may be maintained and updated periodically. In various examples, the summary displayed on the dashboard interface 502 may allow a policy administrator to monitor the status of the logging policies 504, 506, workload profiles 204, workloads 112, and the target environment 436 and perform one or more policy actions 510.

The policy actions 510 may include policy creation 512 for an existing workload profile 204 or a new workload profile 204. Logging policies for an existing workload profile may be created to enhance the volume of logs for a workload, security, and execution of the associated workloads 112. In the case of new workload profiles, existing logging policies, as well as new logging policies, may be used for tagging. The logging policy may be authored using predefined templates, or generic languages, such as Datalog or Rego. In various examples, custom logging policies may also be created using the templates and then applied at the target environment using a policy runtime. The policy runtime may implement a webhook, which may be used by the controller node to accept or reject workload deployment or configuration updates.

In some examples, the policy actions 510 may include policy inheritance 514. For instance, one or more logging policies associated with a first workload profile 204 may be made available to a second workload profile 204. One or more logging policies may also be inherited if the workload version has been updated and the updated workload version requires logging policies associated with an older version of the workload. In some examples, the logging policies 504, 506 associated with the workload profiles 204 may be active for a predetermined period. The associated policies 504, 506 may be deactivated beyond the predetermined period. In some examples, the policy action 510 may include policy extension 516 for extending the logging policy 504, 506 associated with workload profile 204 beyond the predetermined period.

In some examples, the policy action 510 may include policy cloning 518 by creating one or more copies of the logging policies 504, 506. The cloned policies may be used for associating with one or more workload profiles 204.

In some examples, the policy action 510 may also include policy validation 520 for checking whether the logging policies 504, 506 associated with the one or more workload profiles 204 are valid or not. The policy validation 520 may be used for ensuring that the security of the workload is not compromised.

In some examples, the policy action 510 may include policy application 522 for applying one or more logging policies 504, 506 in the target environment 436. The logging policies 504, 506 may be applied regardless of whether the associated with the workload profiles 204 or not.

In some examples, the policy action may include policy update 524 for updating one or more logging policies 504, 506. The policy update 524 may be performed in response to a malicious attack on the workload, malfunctioning of the workload, non-execution of the workload, and the like. In some examples, the one or more logging policies 504, 506 may be updated in response to a change in workload versions.

In some examples, the policy action 510 may include policy revocation 526 for revoking one or more logging policies 504, 506 associated with the workload profiles 204. Further, the policy action 510 may also include policy audit 528 for maintaining a historical record of the logging policies 504, 506. For example, the historical record may include the list of logging policies 504, 506 that are currently associated and were previously associated with a workload profile 204.

In some examples, a policy notification 530 may be used for providing an alert to the system 102 in response to performing any of the policy actions 510. In some examples, the policy action 510 may include policy record 532 for creating a record of logging policies 504, 506 associated with each workload profile 204 and applied at the target environment 436. In some examples, the policy action 510 may include managing policy plugins 534 for managing one or more logging policies attached or embedded with the workload 110 for enforcing the logging policy associated with the workload profile 204. The logging policies 504, 506 may be attached or embedded during the development of the workload.

Figure 6:
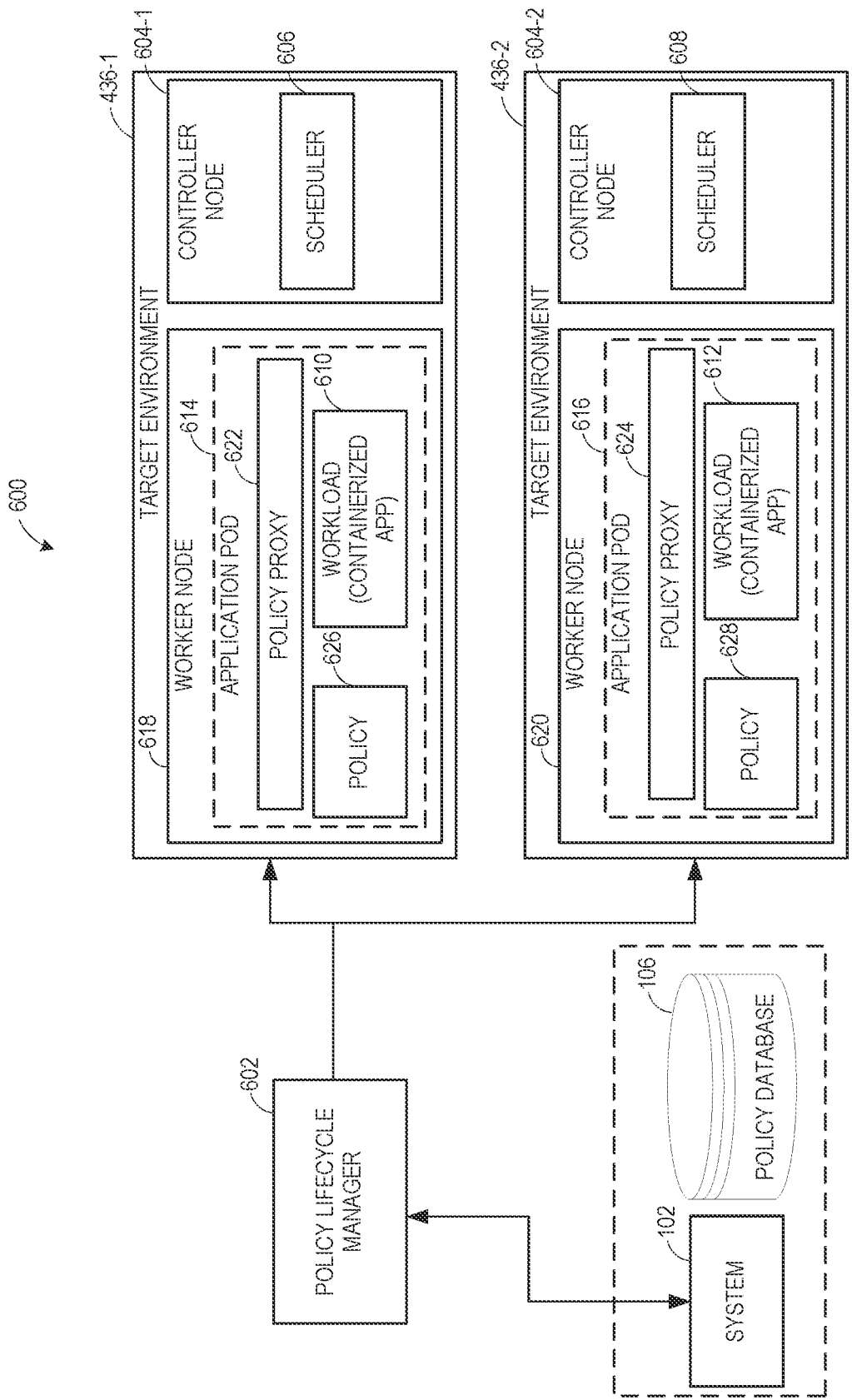
FIG. 6 is a block diagram depicting a policy lifecycle manager to apply logging policies in a target environment, in accordance with an example.

FIG. 6 depicts a policy lifecycle manager for applying logging policies in the target environment, in accordance with an example. A policy lifecycle manager 602 may be configured to receive a request for logging policies from a controller node 604-1, 604-2 in the target environments 436-1, 436-2. In some examples, the target environments 436-1, 436-2 may be the target environment 436 described with reference to FIGS. 4A, 4B and 4C. In other examples, the target environments 436-1, 436-2 may be implemented in other systems. The request may include the workload profile associated with a workload 204. The request including the workload profile may be provided to the system 102. The system 102 may compile the logging policies from the policy database 106 based on the workload profile and provide the compiled policies to the policy lifecycle manager 602.

In some examples, the policy lifecycle manager 602 may be implemented as a Kubernetes Operator. For example, the policy lifecycle manager 602 may be implemented in the system 102, or alternatively in another system coupled over the network (e.g. network 108 in FIG. 1). The policy lifecycle manager 602 may provide the logging policies to the controller node 604-1, 604-2. In some examples, the controller node 604-1, 604-2 may include a scheduler 606, 608 configured to schedule the execution of workloads 610, 612 in the target environment 436-1, 436-2. As shown, the workloads 610, 612 may be containerized applications packaged in an application pod 614, 616. In other examples, the workloads may be pods, containers, virtual machines, and the like. In some examples, the target environment 436-1, 436-2 may be a Kubernetes cluster including a plurality of worker nodes 618, 620. The worker nodes 618, 620 may provide resources, for example, compute, storage, and/or networking capability, for the workloads 610, 612 to execute thereon.

In some examples, the policy lifecycle manager 602 may be configured to inject the one or more policy proxies 622, 624 into the worker nodes 618, 620, respectively. The worker nodes 618, 620 may include the pods 614, 616 that include policy proxy 622, 624 and may package one or more containerized applications or workloads 610, 612. The controller node 604-1, 604-2 may communicate with the policy proxy 622, 624 to mount policies 626, 628 to be applied in the worker node 618, 620. In some examples, the policy proxy 622, 624 may be implemented as a sidecar executable pattern. In some examples, the scheduler 606, 608 may be configured to select the one or more worker nodes 618, 620 in each target environment 436-1, 436-2 for deploying and executing the workloads 610, 612. In some examples, the target environment 436 may include a policy runtime engine (not shown in the figure) for applying custom policies.

Figure 7:
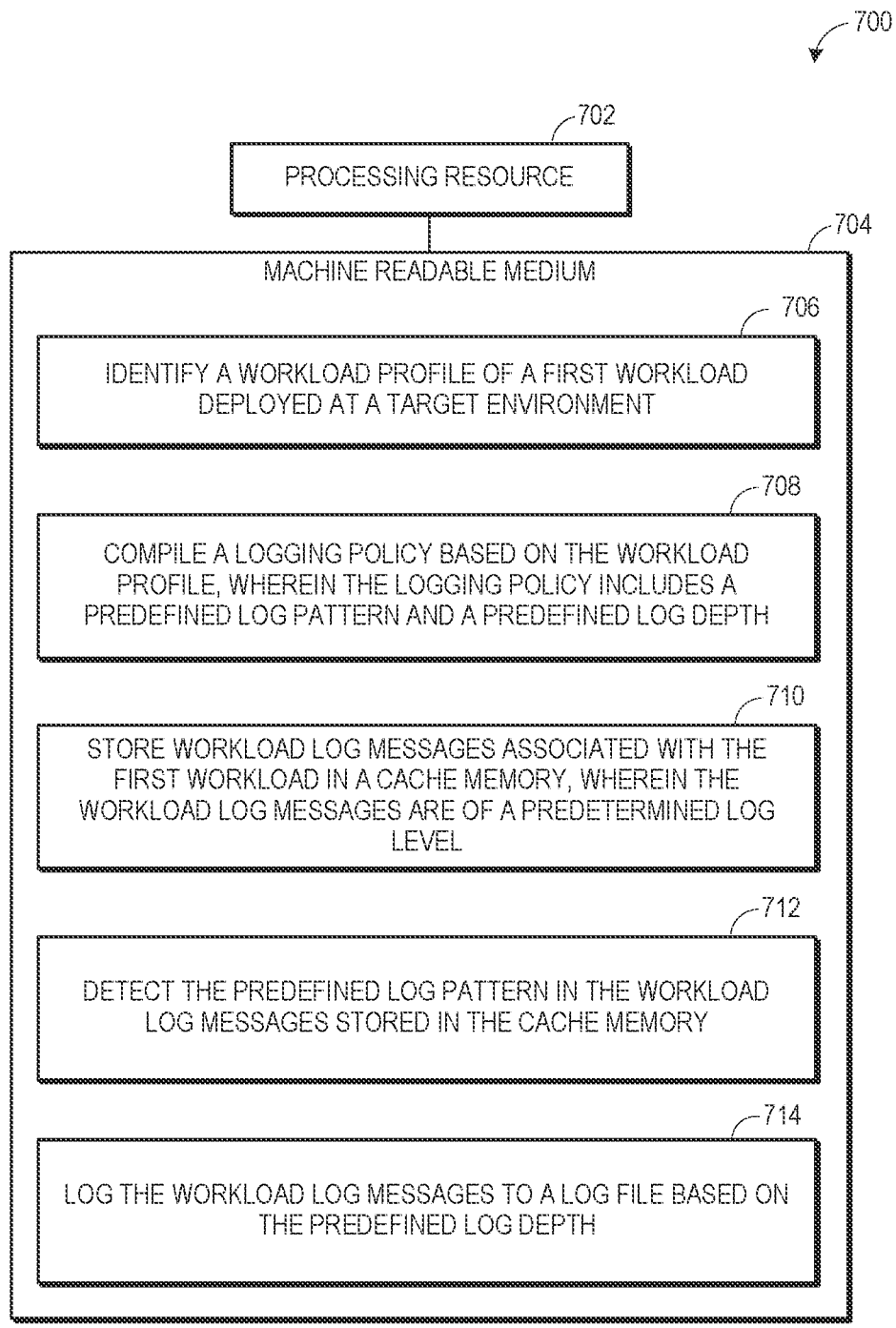
FIG. 7 is a block diagram depicting a processing resource and a machine-readable medium encoded with example instructions to perform policy-based logging using workload profiles, in accordance with an example.

Moving to FIG. 7, a block diagram 700 depicting a processing resource 702 and a machine-readable medium 704 encoded with example instructions to facilitate policy-based logging using workload profiles, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 114 of the system 102. Further, the machine-readable medium 704 may represent one example of the machine-readable medium 116 of the system 102.

The machine-readable medium 704 may be any electronic, magnetic, optical, or other physical storage device that may store data and/or executable instructions. Therefore, the machine-readable medium 704 may be, for example, RAM, an EEPROM, a storage drive, a flash memory, a CD-ROM, and the like. As described in detail herein, the machine-readable medium 704 may be encoded with executable instructions 706, 708, 710, 712, and 714 (hereinafter collectively referred to as instructions 706-714) for performing the method 300 described in FIG. 3. Although not shown, in some examples, the machine-readable medium 704 may be encoded with certain additional executable instructions to perform the method 300 of FIG. 3, and/or any other operations performed by the system 102, without limiting the scope of the present disclosure.

The processing resource 702 may be a physical device, for example, one or more CPU, one or more semiconductor-based microprocessor, one or more GPU, ASIC, FPGA, other hardware devices capable of retrieving and executing the instructions 706-714 stored in the machine-readable medium 704, or combinations thereof. In some examples, the processing resource 702 may fetch, decode, and execute the instructions 706-714 stored in the machine-readable medium 704 to deploy workloads on one or more of the target environments 108. In certain examples, as an alternative or in addition to retrieving and executing the instructions 706-714, the processing resource 702 may include at least one IC, other control logic, other electronic circuits, or combinations thereof that include a number of electronic components for performing the functionalities intended to be performed by the system 102 of FIG. 1.

The instructions 706 when executed may cause the processing resource 702 to identify a workload profile of a first workload deployed at a target environment. Further, the instructions 708 when executed may cause the processing resource 702 to compile a logging policy based on the workload profile. The logging policy includes a predefined log pattern and a predefined log depth. Furthermore, the instructions 710 when executed may cause the processing resource 702 to store the workload log messages associated with the first workload in a cache memory. The workload log messages may be of a predetermined log level. Moreover, the instructions 712 when executed may cause the processing resource 702 to detect the predefined log pattern in the workload log messages stored in the cache memory. Further, the instructions 714 when executed may cause the processing resource 702 to log the workload log messages to a log file based on the predefined log depth.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A method comprising:
   identifying, by a processor-based system, a workload profile of a first workload;
   compiling, by the processor-based system, a logging policy based on the workload profile, wherein the logging policy includes a predefined log pattern and a predefined log depth, the predefined log depth indicating a log size based on a predetermined number of workload log messages associated with a second workload, wherein execution of the first workload is dependent on the execution of the second workload;
   storing, by the processor-based system, workload log messages associated with the first workload and the second workload in a cache memory, wherein the workload log messages are of a predetermined log level;
   detecting, by the processor-based system, the predefined log pattern in the workload log messages stored in the cache memory; and
   logging, by the processor-based system, the workload log messages to a log file based on the predefined log depth.

2. The method of claim 1, wherein the predefined log depth is based on a number of the workload log messages, the workload log messages associated with a predetermined period, the workload log messages associated with a plurality of threads or processes of the first workload, or the workload log messages associated with the plurality of threads or processes of the second workload.

3. The method of claim 1, wherein identifying the workload profile comprises:
   receiving, by the processor-based system, a workload specification including a logging configuration of the first workload; and
   determining, by the processor-based system, the workload profile based on the workload specification.

4. The method of claim 3, wherein the logging configuration includes a user-defined log level, a user-defined log depth, and a user-defined log pattern associated with the first workload.

5. The method of claim 1, wherein compiling the logging policy comprises:

retrieving, by the processor-based system, a logging policy template from a policy database based on the workload profile; and creating, by the processor-based system, the logging policy based on the logging policy template.

6. The method of claim 1, wherein the predetermined log level is a DEBUG log level or a TRACE log level.

7. The method of claim 1, further comprising:
receiving, by the processor-based system, a notification indicative of a policy action performed at a policy database, wherein the policy action includes updating the logging policy;
sending, by the processor-based system, a request for the logging policy to the policy database responsive to the notification; and
recompiling, by the processor-based system, the logging policy from the policy database based on the policy action.

8. The method of claim 1, further comprising:
receiving, by the processor-based system, a request to log the workload log messages of the predetermined log level, wherein the request includes a user-defined log depth; and
logging, by the processor-based system, the workload log messages of the predetermined log level based on the user-defined log depth responsive to the request.

9. The method of claim 1, wherein the first workload includes a container, a pod of containers, or a virtual machine.

10. A system comprising:
a processing resource; and
a machine-readable medium storing instructions that, when executed by the processing resource, cause the processing resource to:
identify a workload profile of a first workload;
compile a logging policy based on the workload profile, wherein the logging policy includes a predefined log pattern and a predefined log depth, the predefined log depth indicating a log size based on a predetermined number of workload log messages associated with a second workload, wherein execution of the first workload is dependent on the execution of the second workload;
store workload log messages associated with the first workload and the second workload in a cache memory, wherein the workload log messages are of a predetermined log level;
detect the predefined log pattern in the workload log messages stored in the cache memory; and
log the workload log messages to a log file based on the predefined log depth.

11. The system of claim 10, wherein the predefined log depth is based on a predetermined number of the workload log messages, the workload log messages associated with a predetermined period, the workload log messages associated with a plurality of threads or processes of the first workload, or the workload log messages associated with the plurality of threads or processes of the second workload.

12. The system of claim 10, wherein to identify the workload profile, the processing resource executes one or more of the instructions to:
receive a workload specification including a logging configuration of the first workload; and
determine the workload profile based on the workload specification.

13. The system of claim 10, wherein to compile the logging policy, the processing resource executes one or more of the instructions to:
retrieve a logging policy template from a policy database based on the workload profile; and
create the logging policy based on the logging policy template.

14. The system of claim 10, wherein the predetermined log level is DEBUG log level or a TRACE log level.

15. The system of claim 10, wherein the processing resource executes one or more of the instructions to:
receive a notification indicative of a policy action performed at a policy database, wherein the policy action includes updating the logging policy;
send a request for the logging policy to the policy database responsive to the notification; and
recompile the logging policy based on the policy action from the policy database.

16. The system of claim 10, wherein the first workload includes a container, a pod of containers, or a virtual machine.

17. A non-transitory machine-readable medium storing instructions executable by a processing resource, the instructions comprising:
instructions to identify a workload profile of a first workload;
instructions to compile a logging policy based on the workload profile, wherein the logging policy includes a predefined log pattern and a predefined log depth, the predefined log depth indicating a log size based on a predetermined number of workload log messages associated with a second workload, wherein execution of the first workload is dependent on the execution of the second workload;
instructions to store workload log messages associated with the first workload and the second workload in a cache memory, wherein the workload log messages are of a predetermined log level;
instructions to detect the predefined log pattern in the workload log messages stored in the cache memory; and
instructions to log the workload log messages to a log file based on the predefined log depth.

18. The non-transitory machine-readable medium of claim 17, further comprising instructions to:
receive a workload specification including a logging configuration of the first workload; and
determine the workload profile based on the workload specification.

19. The non-transitory machine-readable medium of claim 17, wherein the instructions to compile the logging policy further comprising instructions to:
retrieve a logging policy template from a policy database based on the workload profile; and
create the logging policy based on the logging policy template.

20. The non-transitory machine-readable medium of claim 17,
wherein the predefined log depth is based on a predetermined number of the workload log messages, the workload log messages associated with a predetermined period, the workload log messages associated with a plurality of threads or processes of the first workload, the workload log messages associated with the plurality of threads or processes of the second workload.

* * * * *